United States Patent [19]

Liénard

[11] Patent Number: 4,551,834
[45] Date of Patent: Nov. 5, 1985

[54] METHOD AND SYSTEM FOR COMMUNICATING OVER AN OPEN COMMUNICATION NETWORK

[75] Inventor: Jean-Claude Liénard, Brussels, Belgium

[73] Assignee: U.S. Philips Corporation, New York, N.Y.

[21] Appl. No.: 545,320

[22] Filed: Oct. 25, 1983

[51] Int. Cl.⁴ .............................................. H04J 6/00
[52] U.S. Cl. ..................................... 370/94; 371/32; 370/13
[58] Field of Search ....................... 370/60, 94, 13, 92; 371/32; 340/825.54

[56] References Cited

U.S. PATENT DOCUMENTS

| | | | |
|---|---|---|---|
| 4,074,232 | 2/1978 | Otomo et al. | 370/94 |
| 4,398,290 | 8/1983 | Mathieu et al. | 370/94 |
| 4,439,859 | 3/1984 | Donnan | 371/32 |
| 4,445,214 | 4/1984 | Reynolds et al. | 370/94 |

Primary Examiner—Douglas W. Olms
Attorney, Agent, or Firm—Thomas A. Briody; William J. Streeter

[57] ABSTRACT

Method and system for communicating over an open communication network; communication data blocks are provided with a code word with a cyclic numbering for successive blocks to be able to place received block in the correct sequence. By detecting the missing data block and/or an acknowledgement control block with a number added to the data block restoring procedures are preformed. After a successful restoring procedure the number of the originally missed block and or the acknowledgement control block are left out the cyclic numbering for a time at least equal to the warranted maximum packet lifetime in the network.

6 Claims, 9 Drawing Figures

METHOD AND SYSTEM FOR COMMUNICATING OVER AN OPEN COMMUNICATION NETWORK

BACKGROUND OF THE INVENTION

The invention relates to open or transparant communications systems and more particularly, but not exclusively, to private communications systems providing for digital transmission of voice and data in the form of communication data blocks also called packets.

The basic ideas underlying modern packet switching technology are well known and will not be repeated here, references are publications such as "A digital communication network for computers giving rapid response at remote terminals" from D.W. Davies at al in Proc. ACM Symposium on operating system principles, Gatlinburg 1967 and more recently "Data Processing Open Systems Interconnection—Basic Reference Model" from the International Standardisation Organisation, published in Computer Networks 5 (1981) pages81-118.

An advantage of packet switching is that each communication data block is an autonomous entity. If the communication network has several alternative routes, the switching of the communication data blocks leads to optimum use of the network capability. To be able to rearrange received communication blocks from alternative routes, having different transmission times, in the right sequence each of the communication data blocks is provided with a communication header containing a specific code word with cyclic numbering. A loss of a communication data block can easily be detected by comparing the code word number of a received communication data block with the code word number of the immediately beforehand received communication data block as e.g. known from U.S. Pat. No. 4,398,290.

Missing communication data blocks are restored by means of known error recovery procedures.

To prevent that, after a succesfull correction of the flow of communication data blocks, the original missing communication data block and or missing information data blocks used by the error recovery procedure could be confused with new blocks and/or information data blocks, the range of the cycle of the cyclic numbering of the code word had to be in correspondence with the warranted maximum lifetime of the communication data block and/or information data block in the network.

This has not only the disadvantage that the code words have a large number of bits in the communication header of the communication data blocks and thereby reducing the maximum transmission efficiency of the network but has especially the disadvantage that ongoing interconnection of existing networks and the introduction in the network of satellite links, influencing the maximum lifetime, are not possible without enlarging the range of the cyclic numbering, which cannot easily be realized.

SUMMARY OF THE INVENTION

It is an object of the invention to make the range of the cycle of the cyclic numbering of the code words independent of the maximum packet lifetime.

In a broad aspect the present invention provides for a method for operating an open communications network comprising a plurality of network nodes interconnected by transmission resources and a plurality of user boxes connected to the network nodes by further transmission resources, whereby the network nodes includes sending and receiving means, comprising the steps of;

dividing data to be transmitted from a user box into communication data blocks, providing each communication data block with a communication header comprising at least a code word with a cyclic numbering for successive communication data blocks, monitoring the codeword numbers of received communication data blocks for arranging the received data blocks in correct sequence, determining the loss of a communication data block, restoring of the loss of a communication data block by retransmission of said communication data block and leaving the code word number of the missing communication data block out of the cyclic code word numbers and the monitoring procedure after a succesfull restoring procedure.

Moreover the present invention provides for an open communication network comprising a plurality of networks nodes interconnected by transmission resources, a plurality of user boxes connected to the network node by further transmission resources, the network nodes include sending and transmitting means, the sending means having converting means for dividing data to be transmitted from a user box into communication data blocks, each provided with at least a code word with a cyclic numbering for successive communication data blocks, the receiving means having converting means provided with detecting means for monitoring the code word numbers of received communication data blocks for arranging the received data blocks in correct sequence and determining the loss of a communication data block, the receiving and sending means having means for restoring the loss of a communication data block by the retransmission of said communication data block and means for leaving the code word number of the missing communication data block out of the cyclic code word numbers and the monitoring procedure after a succesfull restoring procedure.

This method and system for an open communication network has the advantage that missing data communication blocks cannot be confused with new blocks by a code word numbering much shorter than the warranted maximum lifetime of the communication data block in the network.

According to another aspect the present invention provides for a method for operating an open communication network comprising a plurality of network nodes interconnected by transmission resources and a plurality of user boxes connected to the network nodes by further transmission resources, whereby the network nodes includes sending and receiving means which performs the steps of dividing data to be transmitted from a user box into communication data blocks providing each communication data block with a communication header comprising at least a code word with a cyclic numbering for succesive communication data blocks providing certain communication data blocks, with an explicit acknowledgement request, monitoring the communication data blocks for an explicit acknowledgement request, transmitting back an acknowledgement control block provided with the number of the communication data block with the explicit acknowledgement request if such an explicit acknowledgement request has been detected, monitoring the receiving of an acknowledgement control block, determinging the loss of an acknowledgement control block, restoring of the loss of an acknowledgement control block by retransmission of said acknowledgement control block, leaving the code word number of the missing acknowledgement control blocks out of the cyclic code word numbers and the monitoring procedure after a succesfull restoring procedure.

Moreover the present invention provides for an open communication network comprising a plurality of network nodes interconnected by transmission resources, a plurality of user boxes connected to the network nodes by further transmission resources, the network nodes include sending means and receiving means, the sending means having converting means for dividing data to be transmitted from a user box into communication data blocks, each provided with at least a code word with a cyclic numbering for successive communication data blocks and for providing certain communication data blocks with an explicit acknowledgement request, the receiving means having converting means provided with detecting means for monitoring the communication data blocks for an explicit acknowledgement request, means for transmitting back an acknowledgement control block provided with the number of the communication data block with the explicit acknowledgement request if such an explicit acknowledgement request has been detected, for monitoring the receiving of an acknowledgement control block and means for determining the loss of an acknowledgement control block, the sending and receiving means having means for restoring of the loss of an acknowledgement control block by the retransmission of said communication data block and means for leaving the code word number of the missing acknowledgement control block out of the cyclic code word numbers and the monitoring procedure after a succesfull restoring procedure.

This method and system has the advantage that missing information data blocks in particular a missed acknowledgement control block cannot be confused with a new acknowledgement control block by a code word numbering much shorter than the warranted maximum lifetime of the acknowledgement control block in the network.

According to still a further aspect the invention provides for a method as described above further comprising the steps of, restoring the cyclic numbering of the code words with the left out code word number after a predetermined time, transmitting a command block comprising the restored code word number monitoring the receiving of a command block and restoring the monitoring procedure with the code word number transferred by the received command block.

Moreover the invention provides for a network as desired above in which the sending means are provided with means for restoring the cyclic numbering of the code words with the left out code word number after a predetermined time and means for transmitting a command block comprising the restored code word number and where the receiving means are provided with means for monitoring the receiving of a command block and means for restoring the monitoring procedure with the code word number transferred by the received command block.

This has the advantage that the restoring of the cyclic numbering in the receiving means are coupled to the restoring in the sending means to maintain correct operation.

Particular embodiments of the invention will now be described by way of examples, since however the system may consist of individual electronic circuits of conventional nature, the block diagrams only will be fully defined.

REFERENCE

Philips Telecommunication Review, Vol. 41, No. 3, September 1983 pages 202-224; Soplo-Net ®, a versabile private network, J.E. Liénard.

DETAILED DESCRIPTION OF THE FIGURES

GENERAL

Figure 1:
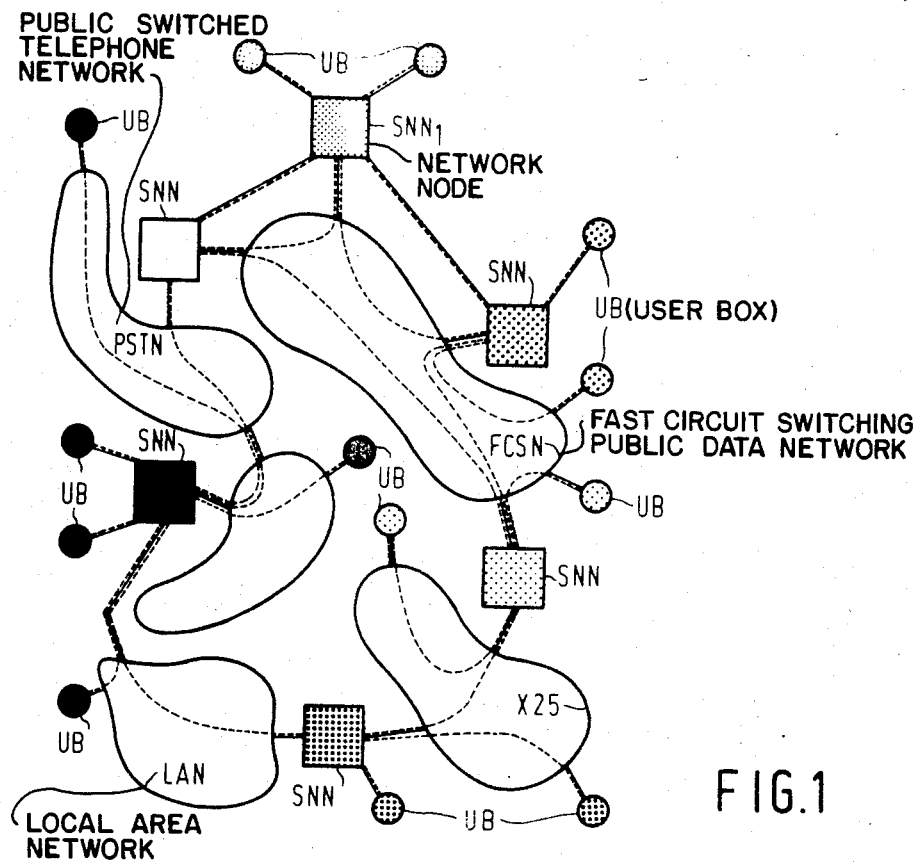
FIG. 1 is a diagram depicting representative elements of an open communication system in accordance with the invention.

A typical open or transparant private communication network is shown in FIG. 1. User boxes UB's are connected to network nodes $SNN_1$, $SNN_2$ ... $SNN_m$ which are interconnected in one or more distinct ways. A user box UB may include one or several terminals word processors, host computers etc. Each user box UB must be connected to its parent network node SNN, e.g. the node where adaption to the standard network protocols takes place. The selection of the node locations is done according to the location and the number of user boxes, taking into account the performance and the cost of the available transmission resources. Thus, the network shown in FIG. 1 makes simultaneously use of several leased lines; the public switched telephone network (PSTN) including private extensions through PABX's; a fast circuit switching public data network (PCSN); an X25 public data network; and a local area network (LAN). However, in practive it may happen that one or more of the indicated transmission resources are missing. All these transmission resources may be used in two different ways, i.e. to connect a certain user box UB to its pertinent node SNN, and to interconnect network nodes SNN's.

Data exchange between two users boxes takes place in a number of steps:

I. from the origin user to its origin parent node, using the native interface of this user box;

II. from the origin parent node to the destination parent node, possible through other nodes, using the standard network protocols;

III. from the destination parent node to the destination user box, using the native interface of this user box.

The private network architecture serves two kinds of end users (EU) i.e. human end users accessing the network through a variety of terminals, and/or application programs, residing in host computers. Human end users may be fixed or wandering. A fixed end user always resides in the same environment and is therefore always served by the same node. Wandering end user may travel from location to location and access the network through the nearest node.

Figure 2:
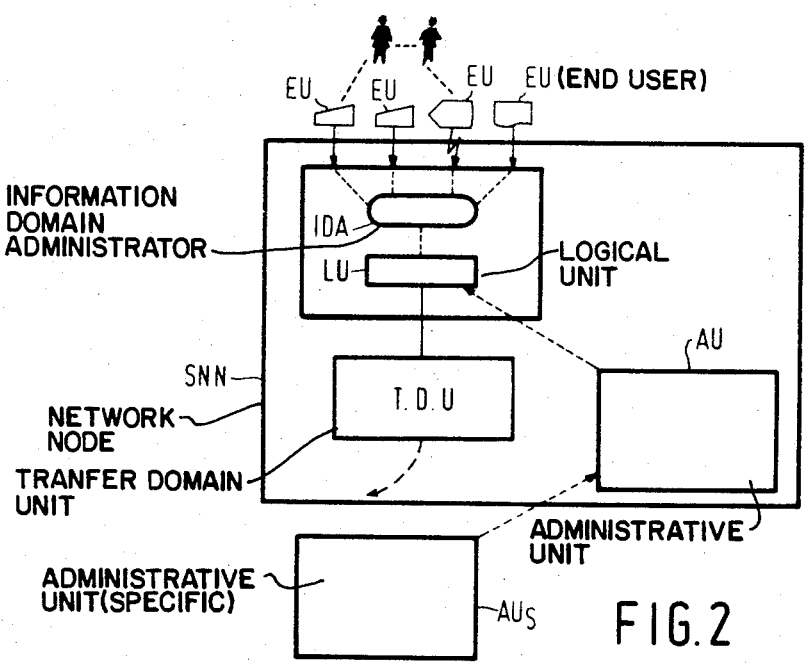
FIG. 2 depicts a network node as used in the open communication network of FIG. 1.

End users may use a variety of terminals (displays, printers, teletypes, etc.) at will. The pool of terminals connected to a node and the set of end users using these terminals are supervised by the Information Domain Administrator (IDA, FIG. 2). The information domain administrator IDA interacts with the end users for control purposes and manages the allocation of terminals to end users. End users know each other names. Names are used by end users for request communication paths to other end users. Communicating end users (EU) are served by a Logical Unit (LU) which handles the end to end protocols. Communication between EU's is:

point to point two and only two EU's are involved in a given communication, real time: both EU's must be active during the communication.

Two cummunicating EU's are interconnected by a logical link called Virtual Communication Paths (VCP). With a VCP one or more flows may exist, depending on user needs. Each flow manages an independent data stream (full duplex). The LU's cooperate with the EU's to open, manage and close the VCP's and the flows.

So called Administration units (Au, FIG. 2) e.g. include a directory function which translates the names of the end users into network addresses. Each node includes a single administrative unit AU. The end users connected to a certain node depend on an administrative unit AU, which may or may not coincide in the same node.

Fixed (not wandering) end users connected to a given node are registered in the relevant administrative unit AU. Wandering end users are registered in a specific administrative unit $AU_s$, and in general is not the same as the administrative unit of the node to which they are connected.

The information domain administrator IDA is coupled with the logic unit LU identified by and address. The end user management consists in exchanging the relevant control information between the end user, its information domain administration IDA, its logical unit LU, the resident administrative unit AU and the node administrative unit $AU_s$ responsible for the end user, when he moves from one network node to another.

In Transfair Domain units TDU (FIG. 2) of each node, three kinds of processes are performed.

Data entering through circuits coming from a given node A are stored in the input queue of a corresponding processor called "receiver A". There is one receiver per neighbour node. Data to be sent to a certain neighbor node X is stored in the input queue of a corresponding process called "sender X". There is one sender per neighbour node. The sender distributes the data present in its input queue to the various circuits leading to the neighbour node.

Each receiver, say A, handles the data present in its input queue. Each data block carries the destination address. This address is passed by the receiver to a central "Routing" processor which selects the most appropriate sender (say X). Sender X notifies its acceptance to receiver A. Receiver A extracts the data block from its input queue and send it to the input queue of sender X.

More details of the system can be found in reference 1, hereby included by reference.

SPECIFIC DESCRIPTION OF THE EMBODIMENT

The local units LU which cooperate via IDA's with the EU's to open, manage and close the virtual communication paths VCP's and the flows, comprises one or more $\mu$ processors e.g. the M 6080 from Motorola.

Figure 3:
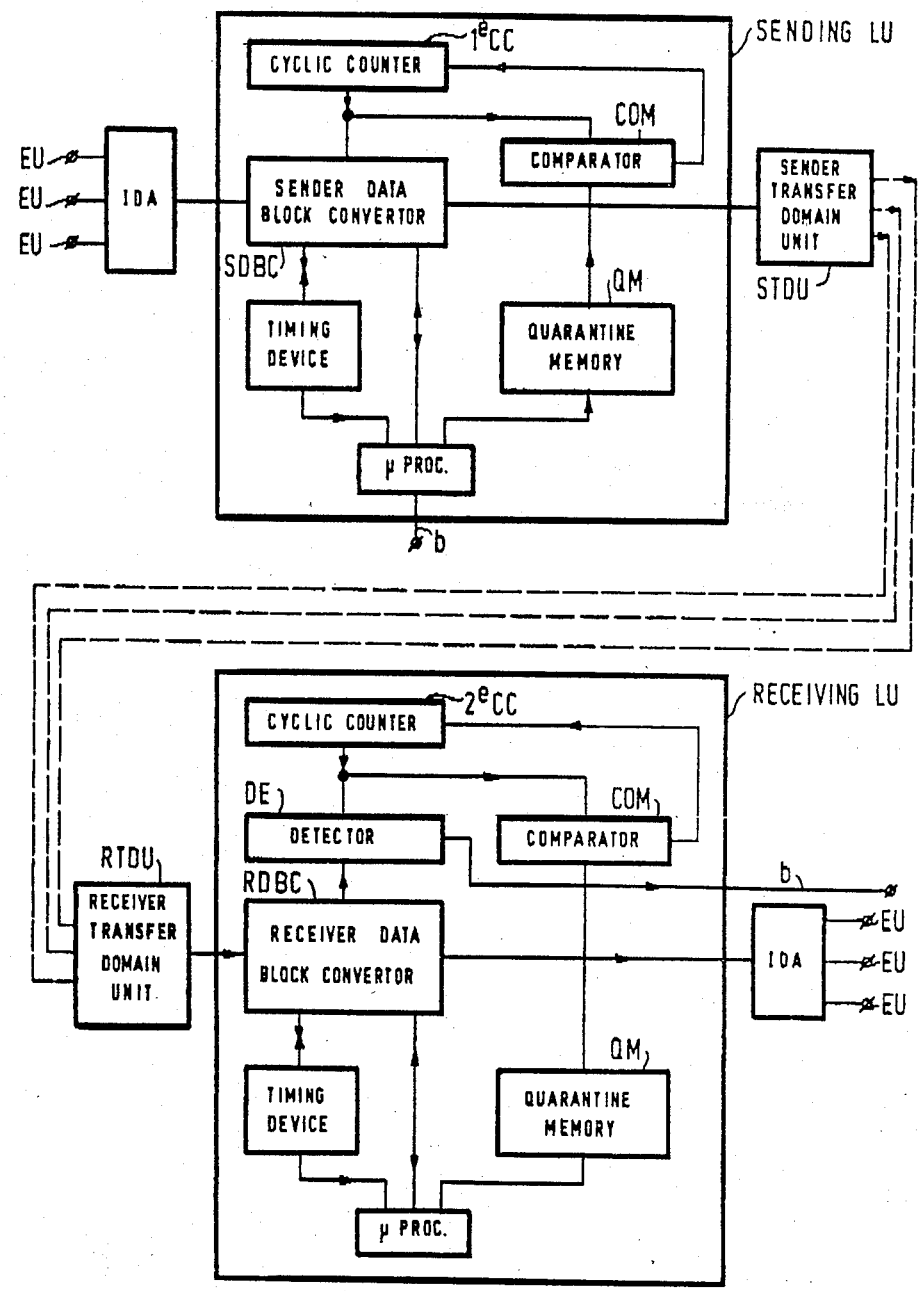
FIG. 3 depicts in greater detail logical units as used the network node of FIG. 2.
Figure 4:
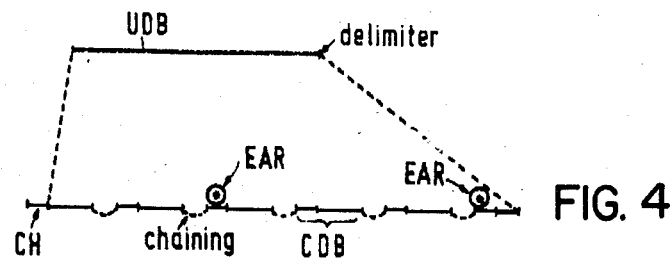
FIG. 4 schematically illustrates the relation between user data blocks and communication data blocks.

For each flow the LU executes protocols related to:
end to end error recovery,
end to end flow control The end user passes the so-called user data block on to its LU. The user data blocks carry explicit delimiters (FIG. 4). The size of the user data block is unlimited: it is determined by the application requirements. The LU cuts up the user data blocks into communication Data Blocks (CDB) of the appropriate size by means of a Sender Data Block convertor (SDBC) (FIG. 3). In the SDBC each CDB receives a communication header (CH) carrying control information from the sending LU to the receiving LU. The SCDB's are coupled to the transmission paths by means of a sender transfer domain unit(STDU). In the receiving LU all CDB's coming from the same user data block (UDB) are chained (FIG. 4) in a receiver transfer domain unit device (RTDU) (FIG. 3) by collecting the data from the transmission paths in order to rebuild the user data block in the reciver data block convertor (RDBC) for sending it via an IDA to the end user EU.

A CDB may or may not carry an Explicit Acknowledgement Request (EAR)(FIG. 4). If it does, the receiving LU must send an (ACK) acknowledgement control block (positive acknowledgement) if the CDB and all the preceeding ones have been correctly received. The last CDB of a chain always carries the EAR. In normal operation (see FIG. 5a), the sending LU will number the CDB's cyclically from 1 to n in a code word included in the communication header (CH) by means of a first cyclic counter (1e CC) (FIG. 3).

Figure 5A:
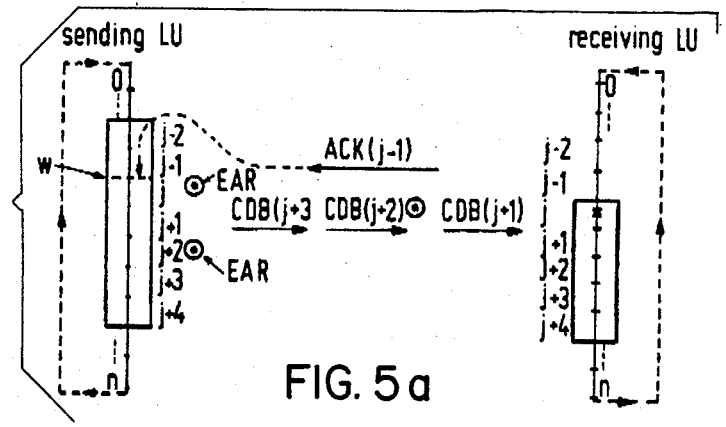
FIG. 5a schematically illustrates the signal flow between a sending logical unit and a receiving logical unit at normal operation.

A window W is defined (in FIG. 5a from j−2 to j+4). The sending LU may send CDB's carrying the numbers within the window. In the receiving LU a detector (DE) detects the numbers carried by the CDB's. A detected number is compared with an expected number delivered by a second cyclic counter (2e CC) (FIG. 3). The detector (DE) also detects the presence of an EAR(already described), the presence of an ACK, already described, the presence of a negative acknowledgement control block NACK, the presence of an enquiry control block ENQ and the presence of a command block (CB). The use of the last three mentioned control blocks will be described further on.

In FIG. 5a the receiving LU has just issued an ACK for number j−1 after having detected an EAR with number j−1 in detector DE. The presence of the EAR was sent via a bus (b) to the local sending LU to transmit the ACK.

The transmitted ACK will be detected in a corresponding way in the remote receiving LU and will push the upper window limit downwards in the transmitting LU which transmitted the EAR.

Two different problems may arise:
a CDB may get lost in the part between the sending and the receiving LU
an ACK may get lost in the reverse direction.

Figure 5B:
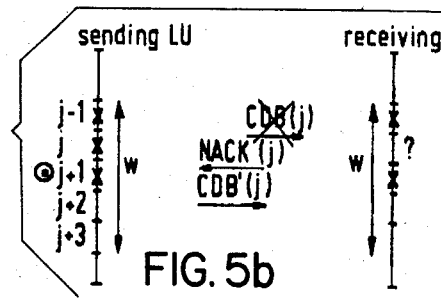
FIG. 5b schematically illustrates the signal flow between a sending logical unit and a receiving logical unit when a missing block is detected by the receiving logical unit.

If a CDB disappears (FIG. 5b), the problem will usually be detected by the receiving LU. For example, if CDB (j+1) has arrived and CDB (j) is still missing, after a certain time-out the receiving LU concludes that CDB (j) has been lost, and sends a negative acknowledgement NACK (j). The sending LU will than retransmit the CDB (j) with a special mark' retransmitted (CDB' (j)).

Figure 5C:
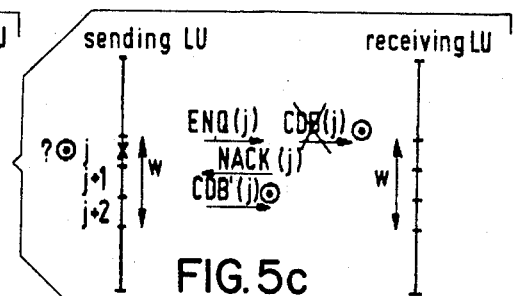
FIG. 5c schematically illustrates the signal flow between a sending logical unit and a receiving logical unit when a missing block is detected by the sending logical unit.

In some cases the receiving LU is unable to detect the missing block, namely if this block is an isolated one. In this case, as explained above, the block always carries an explicit acknowledgement request (EAR) (FIG. 5c). The sending LU expects an ACK within a certain time controlled by a timing device TD. If this ACK does not arrive, the sending LU sends an enquiry ENQ (j), asking the receiving LU if it has received CDB (j). The receiving LU answers with a negative ACK (NACK (j)) that no CBD (j) has been received. The usual retransmission may then take place.

Figure 5D:
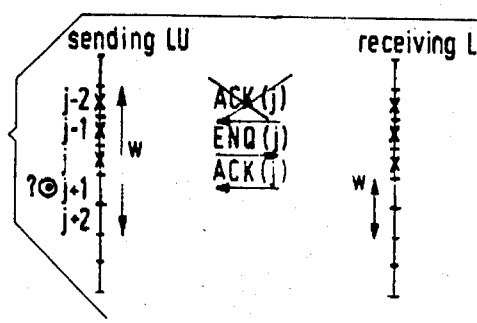
FIG. 5d schematically illustrates the signal flow between a sending logical unit and a receiving logical unit when an missing acknowledgement control block is detected by the sending logical unit and FIG. 5e schematically illustrates the cyclic numbering in the sending and the receiving logical units according to the invention.

If an ACK disappears (FIG. 5d), the sending LU in the same way sends an ENQ(j). The receiving LU repeats its ACK(j) with the special mark retransmitted' (ACK'(j)). The process of exchanging ACK, NACK, ENQ and retransmitted CBD' may be repeated at will until the receiving LU receives a correct copy of the CDB and the sending LU receives an appropriate acknowledgement.

At all times before the problem is solved both the sending and the receiving LU's are aware of its existance.

After the error recovery procedure has been ended, erratic ACK, NACK, ENQ and/or CDB; carrying the number j may exist somewhere in the network. These erratic blocks are dangerous because if they arrive much later they could be confused with new blocks carrying the same number. To avoid this, the sending and receiving LU's put the dangerous number j in quarantine, so the erratic blocks, if received, will be disregarded.

This can be realised by putting the dangerous number j in a quarantine memory (QM) in the transmitting LU as well as in the receiving LU. In comparators COM in the LU's the number contents of the counters are contineously compared with the numbers stored in the quarantine memories QM. When coincidence is detected the counters are triggered to increase their number by one.

Figure 5E:
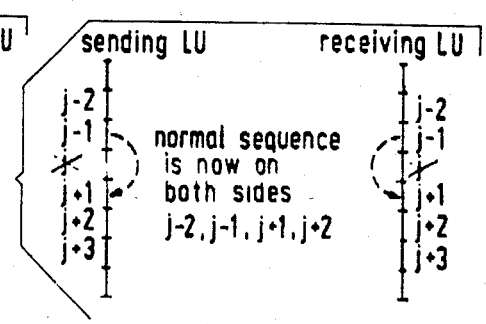

The agreed sequence of numbers is than on both sides . . . j−2, j−1, j+1, j+2, . . . (FIG. 5e). By the timing means TD j is put again into service in the sending means after a time-out equal to the warranted maximum packet (CDB, ACK, Nack, ENQ) lifetime in the network. And in the receiving means by the detection of a command block (CB) send from the sending LU to the receiving LU whereby a correct operation of the network is guaranteed. There is obtained a range of numbering scheme independent of the maximum packet lifetime.

This is a very desirable property because the advent of new technologies and the ongoing interconnection of existing networks are likely to influence the maximum packet lifetime.

What is claimed is:

1. A method for operating an open communications network comprising a plurality of network nodes interconnected by transmission resources and a plurality of user boxes connected to the network nodes by further transmission resources, whereby the network nodes includes sending and receiving means, comprising the steps of:

dividing data to be transmitted from a user box into communication data blocks;

providing each communication data block with a communication header comprising at least one code word cyclically numbered for successive communication data blocks;

receiving said communication data blocks in a receiving means of one of said nodes;

monitoring the code word numbers of received communication data blocks and arranging the received data blocks in correct sequence, determining the loss at said receiving means of a communication data block;

restoring the loss of a communication data block by requesting retransmission of said communication data block from said sending means, and leaving the code word number of the missing communication data block out of the cyclic code word numbers and the monitoring procedure after said restoring procedure is effected.

2. A method for operating an open communication network comprising a plurality of network nodes interconnected by transmission resources and a plurality of user boxes connected to the network nodes by further transmission resources, whereby the network nodes include sending nd receiving means, comprising the steps of:

dividing data to be transmitted from a user box into communication data blocks;

providing each communication data block with a communication header comprising at least one code word cyclically numbered for successive communication data blocks;

providing certain of said communication data blocks with an explicit acknowledgement request;

sending and receiving each of said communication data blocks from one of said sending means to one of said receiving means;

monitoring the received communication data blocks for an explicit acknowledgement request;

transmitting back an acknowledgement control block from said receiving means to said transmitting means provided with the number of the communication data block having the explicit acknowledgement request when such an explicit acknowledgement request has been detected at said transmitting means;

monitoring at said transmitting means the receipt of an acknowledgement control block;

determining the loss of an expected acknowledgement control block at said transmitting means, restoring the loss of an acknowledgement control block to said receiving means; and leaving the code word number of the missing acknowledgement control block out of the cyclic code word numbers and the monitoring procedure after restoring said acknowledgement control block.

3. A method according to claim 1 or 2 comprising the additional steps of:

restoring the cyclic numbering of the code words of the left out code word number after a predetermined time;

transmitting a command block comprising the restored code word number from said transmitting means;

monitoring at said receiving means the receiving of a command block; and restoring the monitoring procedure with the code word number transferred by the received command block.

4. An open communication network comprising a plurality of network nodes interconnected by transmission resources, a plurality of user boxes connected to the network nodes by further transmission resources, the network nodes include sending and transmitting means, the sending means having converting means for dividing data to be transmitted from a user box into communication data blocks, each provided with at least a code word with a cyclic numbering for successive communication data blocks, receiving means having converting means provided with detecting means for monitoring the code word numbers of received communication data blocks for arranging the received data blocks in correct sequence and determining the loss of a communication data bloc, the receiving and sending means having means for restoring the loss of a communication data block by the retransmission of said communcation data block; and means for leaving the code word number of the missing communication data block out of the cyclic code word numbers and the monitoring procedure after said restoring procedure retransmits said communication block.

5. An open communication network comprising a plurality of network nodes interconnected by transmission resources, a plurality of user boxes connected to the network nodes by further transmission resources, each of the network nodes include sending means and receiving means, the sending means having converting means for dividing data to be transmitted from a user box into communication data blocks, each provided with at least a code word with a cyclic numbering for successive communication data blocks and for providing certain communication data blocks with an explicit acknowledgement request, the receiving means having converting means provided with detecting means for monitoring the communication data blocks for an explicit acknowledgement request, means for transmitting back from said receiver means an acknowledgement control block provided with the number of the communication data block containing the received explicit acknowledgement request if such an explicit acknowledgement request has been detected in a received acknowledgement control block, and means for determining the loss of an acknowledgement control block at said sending means, the sending and receiving means having means restoring the loss of an acknowledgement control block by retransmitting said communication data block, and means for leaving the code word number of the missing acknowledgement control block out of the subsequent cyclic code word numbers and the monitoring procedure after said restoring procedure retransmits a last communication data block.

6. A network according to claim 4 or 5 where the sending means are provided with means for restoring the cyclic numbering of the code words with the left out code word number after a predetermined time and means for transmitting a command block comprising the restored code word number, and the receiving means are provided with means for monitoring the receipt of a command block and means for restoring the monitoring procedure for the restored code word number transferred by the received command block.

* * * * *